United States Patent
Nayyar

(10) Patent No.: US 8,193,980 B2
(45) Date of Patent: Jun. 5, 2012

(54) DOPPLER AND CODE PHASE SEARCHES IN A GNSS RECEIVER

(75) Inventor: Jasbir Singh Nayyar, Punjab (IN)

(73) Assignee: Texas Instruments Incorporated, Dallas, TX (US)

( * ) Notice: Subject to any disclaimer, the term of this patent is extended or adjusted under 35 U.S.C. 154(b) by 597 days.

(21) Appl. No.: 12/045,047

(22) Filed: Mar. 10, 2008

(65) Prior Publication Data

US 2009/0224973 A1    Sep. 10, 2009

(51) Int. Cl.
*G01S 19/11* (2010.01)
(52) U.S. Cl. .................................. 342/357.48
(58) Field of Classification Search ............ 342/357.01–357.17, 357.2–357.78
See application file for complete search history.

(56) References Cited

U.S. PATENT DOCUMENTS

| | | | |
|---|---|---|---|
| 6,775,319 B2* | 8/2004 | King et al. | 375/150 |
| 7,391,364 B2* | 6/2008 | Hsu | 342/357.68 |
| 2007/0008217 A1* | 1/2007 | Yang et al. | 342/357.12 |
| 2007/0063893 A1* | 3/2007 | Horton et al. | 342/357.09 |
| 2009/0103656 A1* | 4/2009 | Chen | 375/329 |

* cited by examiner

*Primary Examiner* — Thomas Tarcza
*Assistant Examiner* — Nga X Nguyen
(74) *Attorney, Agent, or Firm* — Ronald O. Neerings; Wade James Brady, III; Frederick J. Telecky, Jr.

(57) ABSTRACT

According to an aspect of the present invention, each correlation block in a Global Navigation Satellite System (GNSS) receiver is designed to examine a certain number of consecutive samples of an input signal and a buffer is designed to store more than such number of samples. Due to such storing, each correlator may perform multiple correlations for the same set of received samples. According to another aspect, such searches may be performed without rotating a local code by controlling the specific samples provided as window samples. Thus, while performing Doppler searches, different frequencies can be searched using the same local code without rotation. While performing code phase searches, the window samples may start from different positions with the position determining the specific phase being searched.

21 Claims, 5 Drawing Sheets

DOPPLER AND CODE PHASE SEARCHES IN A GNSS RECEIVER

BACKGROUND

1. Field of the Invention

The present invention relates generally to navigation receivers, and more specifically to a method and apparatus for performing Doppler and code phase searches in a Global Navigation Satellite System (GNSS) receiver.

2. Related Art

Global Navigation Satellite System (GNSS) generally refers to satellite-based navigation systems, which provide geo-spatial positioning capabilities (i.e., determination of position). As is well known in the relevant arts, in a GNSS system, satellites (GNSS transmitters) transmit GNSS signals carrying ranging information, correction parameters, etc., that enable a receiver capable of receiving GNSS signals (GNSS receiver) to compute its position. Global Positioning System (GPS), WAAS (Wide Area Augmentation System), Galileo System are some examples of GNSS.

Typically, a GNSS signal contains a data combined with a code, with the combination modulating a carrier. In a GNSS system, multiple satellites may be present, with each transmitting a GNSS signal having a same carrier frequency, but different codes and data. In general, each transmitter is assigned a corresponding different code. Thus, a received GNSS signal (at a GNSS receiver's antenna, for example) may contain one or more of the transmitted GNSS signals (transmitted by respective transmitters).

In order to recover data from the respective transmitted signals contained in the received GNSS signal, a GNSS receiver generally needs to search the corresponding transmitted signals, a procedure often termed signal acquisition and then lock onto them, and to track the further changes, referred to as tracking. A procedure often implemented in a GNSS receiver to acquire/track a transmitted signal entails correlating a down-converted (often at baseband) received GNSS signal with a corresponding local signal (generated within the receiver).

Correlations are often performed for code phase searches and carrier Doppler searches. As is well known, a code phase search implies determining the specific time instance (or point on the received signal) at which each code commences.

On the other hand, a Doppler search is directed to determination of the carrier frequency. While the applicable standards specify an ideal carrier frequency, the actual frequency with which the signal is received can change due to Doppler effect. As is well known in the relevant arts, due to relative motion between a GNSS receiver and a satellite, the carrier frequency of the transmitted signal may deviate from a nominal value (ideal carrier frequency) due to the Doppler effect.

It is generally desirable that the code phase and Doppler searches be performed while meeting the various requirements as suited to the specific environments of deployment.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
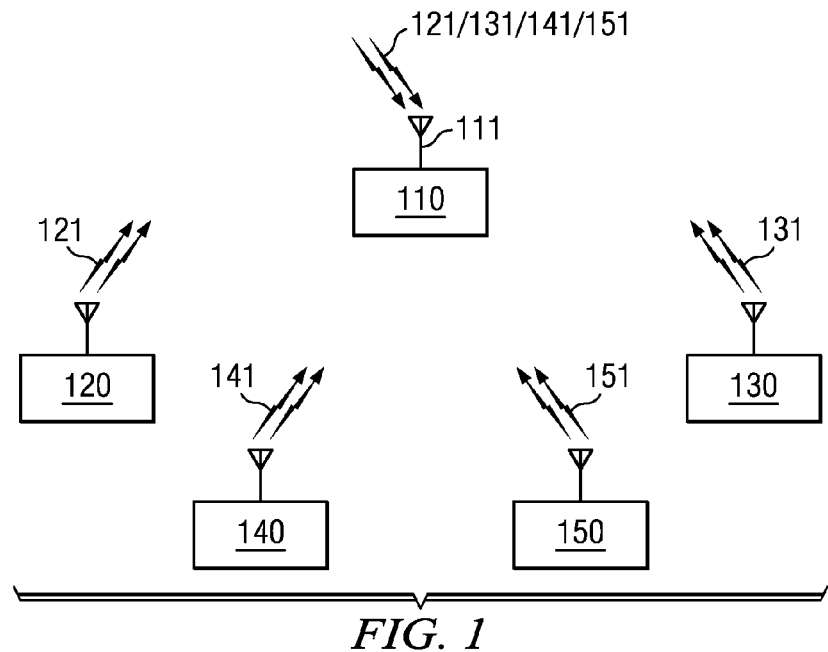
FIG. 1 is a block diagram of an example environment in which several aspects of the present invention can be implemented.

According to an aspect of the present invention, each correlation block in a Global Navigation Satellite System (GNSS) receiver is designed to examine a certain number of consecutive samples (window samples) of an input signal and a buffer is designed to store more than such number of samples.

Due to such storing, each correlator may be able to operate with the corresponding (different) required set of samples, which can lead to several benefits depending on the environment in which the features are deployed. In an embodiment, multiple searches are performed by each of the correlators processing the corresponding received GNSS signal due to such storing of additional samples.

According to another aspect of the present invention, the window samples examined by each correlator do not contain a data bit-flip (value change) while performing Doppler searches. Respective multiplexors may be designed to select samples to avoid data bit-flip for each correlator. Multiple frequencies can be searched on such same window samples using the local code without rotation. Due to the absence of bit-flips, correlation loss can be avoided while performing multiple Doppler searches on the same set of received samples.

According to another aspect of the present invention, the window samples are provided starting from different positions to a correlator based on the same stored samples. The position for each window samples determines the phase being searched and the local code can again be used without rotation while performing a code phase search (also) on corresponding window samples.

According to yet another aspect of the present invention, multiple windows samples corresponding to corresponding code phases may be provided to a correlator based on the same set of stored samples. The correlator can accordingly perform a corresponding number of code phase searches based on the same samples stored in a buffer.

Thus, by storing more samples than contained in windows samples, multiple (Doppler and/or Code phase) searches are facilitated, potentially without having to rotate the local code.

A processor may control different correlators to perform different number of Doppler and/or code phase searches for the corresponding GNSS signal.

In one embodiment, the buffer contains three memory blocks each with a capacity to store one code period worth of samples. While two of these blocks are provided to each of the multiplexors, the third block is used to store currently received samples. As a result, window samples for each of the correlators can be selected without containing a corresponding bit-flip.

In an alternative embodiment, each multiplexer receives 2/Nth of the code period worth of samples, and (respective) 1/Nth (N being an integer) of the code period worth of samples are provided to each correlator. Each correlator generates a partial correlation value for each such window samples. Aggregate correlation value is generated based on N of such partial correlation values. The memory requirement within the buffer is reduced, while still avoiding the correlation loss.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Environment

FIG. 1 is a block diagram of an example environment in which several aspects of the present invention can be implemented. The diagram is shown containing GNSS receiver 110, and GNSS transmitters 120, 130, 140 and 150. Merely for illustration, the components of FIG. 1 are assumed to correspond to a satellite-based navigation system such as GPS, WAAS or Galileo systems. However, several of the features can be implemented in other GNSS environments as will be apparent to one skilled in the relevant arts by reading the disclosure provided herein. Similarly, merely for illustration, the environment is chosen to contain fewer transmitters, etc., though several real-world environments contain many more devices, both in type and number.

Assuming a satellite-based navigation system environment, each of GNSS transmitters 120, 130, 140 and 150 corresponds to a satellite transmitting a corresponding GNSS signal containing information (data values) that enables GNSS receiver 110 to determine its position. Only four GNSS transmitters are shown for simplicity. However, typically many more transmitters may be present.

GNSS transmitter 120 transmits a GNSS signal 121, GNSS transmitter 130 transmits a GNSS signal 131, GNSS transmitter 140 transmits a GNSS signal 141, and GNSS transmitter 150 transmits a GNSS signal 151.

GNSS receiver 110 receives signals 121, 131, 141 and 151 (via antenna 111), and determines its position (in a corresponding Cartesian coordinate system, or as latitude, longitude and height with respect to the earth's surface) in a manner well known in the relevant arts once the data values from the received signal are recovered.

Various features of the present invention enable GNSS receiver 110 to perform multiple Doppler and code phase search in parallel with reduced/optimal buffer size in the GNSS receiver. The features can be appreciated based on an understanding of the structure of the signal received at antenna 111. Accordingly, the description is continued with respect to an example signal structure of any of signals 121/131/141/151.

3. Example Signal Structure

Figure 2:
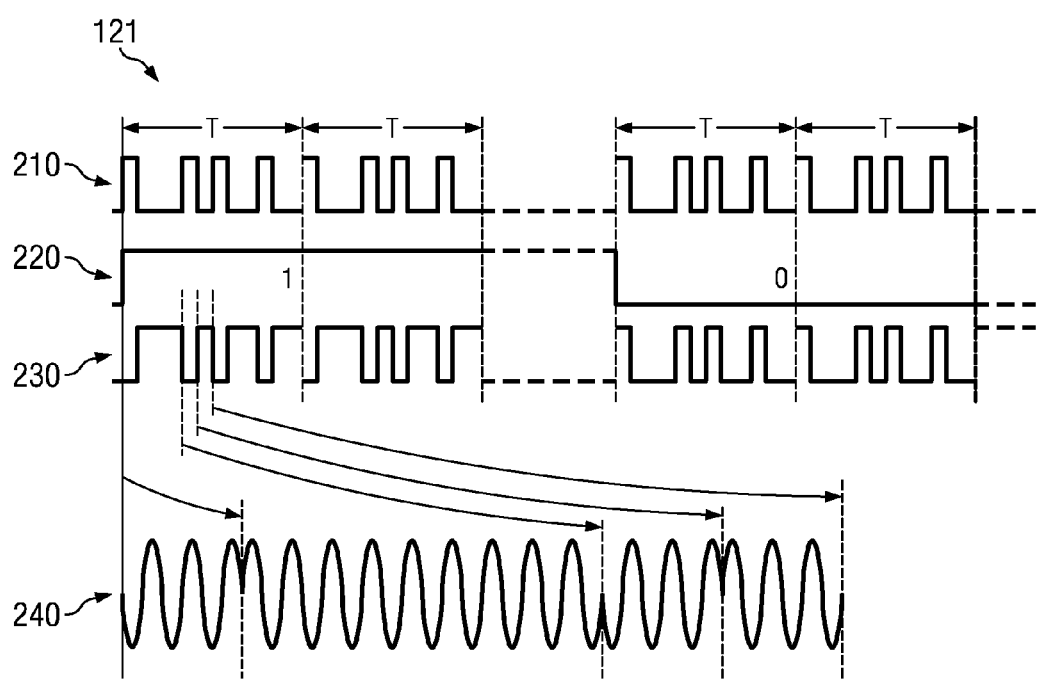
FIG. 2 is a diagram illustrating an example signal structure of a GNSS signal.

FIG. 2 is a diagram illustrating an example signal structure of a GNSS signal (either transmitted by transmitter 120 or received at antenna 111). The diagram shows details of signal 121 though the description is applicable to other signals 131, 141, and 151 as well. It should be appreciated that waveform 240 is shown on an 'expanded' time scale (for clarity) and the inter-relation of specific portions is illustrated by arrows.

Waveform 210 represents a spreading code used to spread the bandwidth occupied by the data (220) to a much wider bandwidth according to direct sequence spread spectrum technology. As is well known, each transmitter 120/130/140/150 uses a corresponding different code. Waveform 210 is shown containing multiple code bits in each code period T, and is generally a pseudo random sequence (example pseudo random binary sequence). The code is shown as 10010100100 merely for illustration.

Waveform 220 represents a data value (with each value containing potentially several bits) containing information that enables GNSS receiver 110 in determining its position, as noted above, and may include the position of satellite 120, orbital information of satellite 120, clock information, various correction parameters etc., as is well known in the relevant arts. A single data bit of a GNSS signal can span one or more code periods and the corresponding duration is referred to as a data bit period, depending on the specific system (whether GPS, WAAS, Galileo, etc).

Data 220 and code 210 are combined to generate a waveform 230 (representing a modulating value). For example, in the context of GPS, data 220 and code 210 are combined using an exclusive-OR (XOR) operation to generate waveform 230, as shown with example code and data portions in FIG. 2. However, alternative combining techniques can be used to generate the combined value, as will be apparent to one skilled in the relevant arts by reading the disclosure provided herein.

Waveform 230 modulates a carrier of a known (and fixed) frequency, and an example modulated carrier (the GNSS signal) is shown by waveform 240. With respect to GNSS signal 240, it is assumed that BPSK modulation is used (though other techniques can be used, without departing from the scope and spirit of various aspects of the present invention) to modulate the carrier, as may be observed from waveform 240, only a portion of which is shown in the Figure. It is note that in the Figure, only three carrier cycles are shown corresponding to one code bit period, however typically the number of carrier cycles in one code bit period is much larger.

As is well known in the relevant arts, each GNSS signal 121, 131, 141 and 151 contains a different code, but a same carrier frequency. GNSS receiver 110 extracts data 220 from a GNSS signal 121 by generating a local signal by combining a replica of code 210 and the carrier in a similar manner as in GNSS transmitter 120, and correlating the generated local signal with signal 121. GNSS receiver 110 extracts data from signals 131, 141 and 151 in a correspondingly similar manner. A brief description of GNSS receiver 110 is provided next.

4. Example Receiver

Figure 3A:
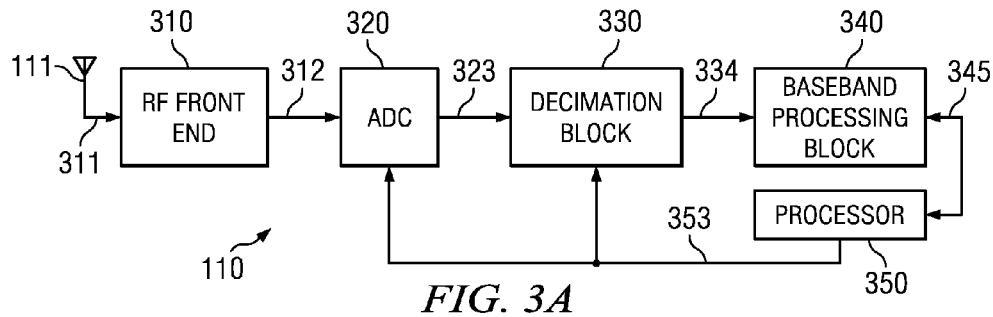
FIG. 3A is a block diagram of a GNSS receiver in an embodiment.

FIG. 3A is a block diagram of the details of a GNSS receiver in an embodiment. GNSS receiver 110 is shown containing antenna 111, RF front end 310, analog to digital converter (ADC) 320, decimation block 330, baseband processing block 340, and processor 350. Each component is described in detail below.

Antenna 111 receives signals 121, 131, 141 and 151, and provides the signals to RF front end 310 on path 311. The combination of all the GNSS signals provided by antenna 111 to RF front end 310 is also referred to as a received GNSS signal.

RF front end 310 performs various front-end signal processing operations, such as band-pass filtering, amplification using a low-noise amplifier etc., on the received GNSS signal. In some embodiments, RF front end 310 may also perform one or more levels of down-conversion, i.e., operate on the signal to bring the carrier frequency down to a lower frequency (Intermediate frequency/IF). RF front end 310 provides the processed signal, for example at IF frequency, to ADC 320 via path 312.

ADC 320 samples the IF signal received from RF front end 310, and converts the IF signal to corresponding digital codes/samples (by sampling at corresponding time instances). The sampling rate may be selected to be sufficiently high such that code and data information in the IF signal is preserved. ADC 320 provides the samples to decimation block 330 on path 323.

Decimation block 330 performs various operations on the samples received on path 323 to reduce (down-convert) the IF frequency to baseband. Thus, decimation block 330 provides the final down-converted signal to baseband processing block 340. In some embodiments, decimation block 330 may also operate to remove a common carrier Doppler component (common to all transmitted GNSS signals caused for example, by a frequency offset/variation in a master clock used to generate local signals in receiver 110 (in baseband processing block 340, described below). Decimation block 330 provides samples corresponding to the final down-converted signal to baseband processing block 340 on path 343. ADC 320 and decimation block 330 may (optionally) receive control signals via path 353 from processor 350 to set various parameters related to their operations.

Baseband processing block 340 generates local signals corresponding to each transmitted GNSS signal, and correlates the received GNSS signal with each of the local signals to acquire and track (to maintain lock even if there are further changes) the transmitted GNSS signals. Baseband processing block may provide the results (typically a number representing the degree of similarity of the corresponding local and transmitted GNSS signal) of each correlation operation to processor 350 via path 345, and receives commands for controlling its operation from processor 350 also via path 345. An example embodiment of baseband processing block 350 is described in greater detail below.

Processor 350 processes the correlation results received via path 345 from baseband processing block 340 to extract the data transmitted by the satellites. The extracted data is used as a basis to determine the position of GNSS receiver 110 according to one of several known techniques. Processor 350 may correspond to a general purpose processor or to application specific processor such as a digital signal processor (DSP).

Figure 3B:
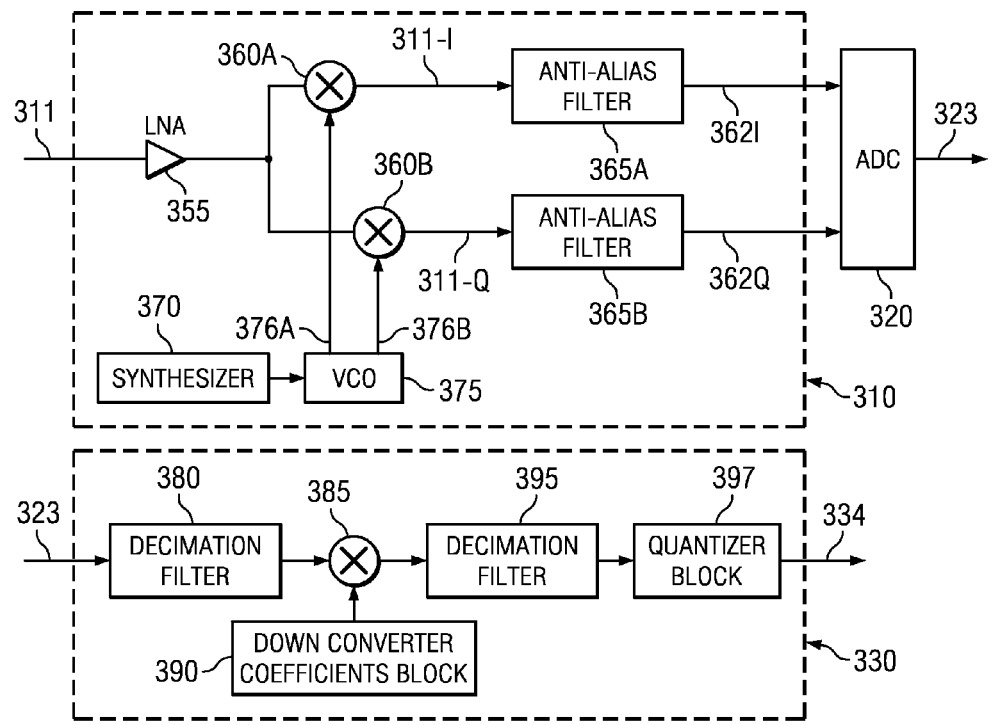
FIG. 3B is a block diagram of internal details of a portion of a GNSS receiver.

FIG. 3B is a diagram illustrating the internal operations in the signal path from RF front end 310, ADC 320 to decimation block 330 in greater detail, in one embodiment. LNA 355, mixers 360A and 360B, anti-alias filters 365A and 365B, synthesizer 370 and VCO 375 are contained in RF front end 310 of FIG. 3, while decimation filters 380 and 395, mixer 385, down-converter coefficient block 390 and quantizer block 397 are contained in decimation block 330 of FIG. 3.

To describe briefly, low-noise amplifier (LNA) 355 provides amplification to the received GNSS signal on path 311. Synthesizer 370 in conjunction with voltage controlled oscillator (VCO) 375 generates two signals at frequencies lower or higher than the carrier frequency (with no down-conversion) of the transmitted GNSS signals. The two signals on respective paths 376A and 376B are 90 degrees apart in phase and represent sine and cosine components.

The output of LNA 355 is provided to mixers 360A and 360B, in which it is multiplied by the sine and cosine components received respectively on paths 376A and 376B to form I and Q components 311-I and 311-Q of the received GNSS signal 311 at an intermediate frequency (IF). IF components 311-I and 311-Q are filtered by respective anti-alias filters 365A and 365B to remove undesired frequency components, and the respective filtered IF signals are provided on respective paths 362I and 362Q to ADC 320. Paths 362I and 362Q are deemed to be contained in path 312 of FIG. 3A.

ADC 320 operates as described above to generate digital samples of the respective filtered signals. Corresponding to each sampling instance, ADC 320 may provide both of signals 362I and 362Q as a single output in complex format on path 323. Decimation filter 380 performs a decimation operation on the samples on path 323. Mixer 385 further down-converts the signal represented by the (decimated) samples received from decimation filter 380 by performing complex multiplication on the samples with corresponding coefficients received from down-converter coefficients block 390.

Decimation filter 395 operates to perform further decimation on the down-converted samples received from mixer 385 after down-conversion to baseband. Quantizer block 397 quantizes each sample received from decimation filter 395 to reduce the number of bits to represent each sample. The output of quantizer 395 represents the final down-converted received GNSS signal, and is forwarded to baseband processing block 340, as noted above.

Continuing with the description of FIG. 3A, baseband processing block (under control from processor 350) operates to perform carrier Doppler searches as well as code phase searches, as noted above. Thus, baseband processing block 340 may perform several iterations of correlations with the received GNSS signal and a local signal. The local signal corresponding to each iteration may potentially contain a different carrier frequency and/or code phase.

As an illustration, a first iteration may be performed with the replica (local) carrier having a frequency fc (fc being the "ideal" carrier frequency, with no Doppler, of the final down-converted signal provided by decimation block 330 on path 334) and the local code having a phase P1.

A next iteration may be performed with the local carrier having a frequency (fc+Δf), and the local code having a phase P2. The above procedure may be continued till the correlation threshold crosses the desired value, and the GNSS signal is deemed to have been acquired. In the procedure noted above, both carrier Doppler and code phase searches have been described as being performed simultaneously.

However, typically, in a given receiver multiple code phases can be searched in parallel along with searching Dopplers in a serial fashion to maintain a balance between performance and Area/Power. This is done by storing incoming samples in a buffer and using it for multiple iterations.

It is noted here that the Doppler and code phase search during the signal acquisition procedure noted above may be slightly modified based on whether or not the receiver has some preliminary (a priori) information about its position co-ordinates/time. When no information or a priori estimate of position is available to receiver 110, the receiver starts the acquisition in what is generally termed a "cold start" mode. In such a mode, all code phases and all Dopplers may have to be potentially searched (typically the maximum Doppler range is known beforehand based on the maximum possible relative velocities of receiver 110 and the satellites).

However, when receiver 110 has some a priori estimate of its position, the receiver starts the acquisition in what is generally termed a "hot start" or "assisted" mode. In such a mode, based on the a priori information, only a subset of all the code phases and carrier Dopplers may have to be potentially searched. Taking advantage of this fact multiple Dopplers can be searched in parallel along with the reduced code phases search space using the already available search capability.

By "searching in parallel", it is meant that a same portion of samples of a GNSS signal can be used for performing the searches. For example, if a receiver is capable of searching 1023 code phases in parallel with one Doppler, it can search "M" different Dopplers along with 1023/M code phases with the same computation capability. Thus acquisition time may be reduced by a factor of M. Multiple Doppler coefficients can be generated assuming the phase to be constant for some N samples in a piecewise linear fashion, since carrier phase change may be very small from sample to sample.

The description is continued with an illustration of the internal details of baseband processing block 340 in an embodiment.

5. Baseband Processing Block

Figure 4A:
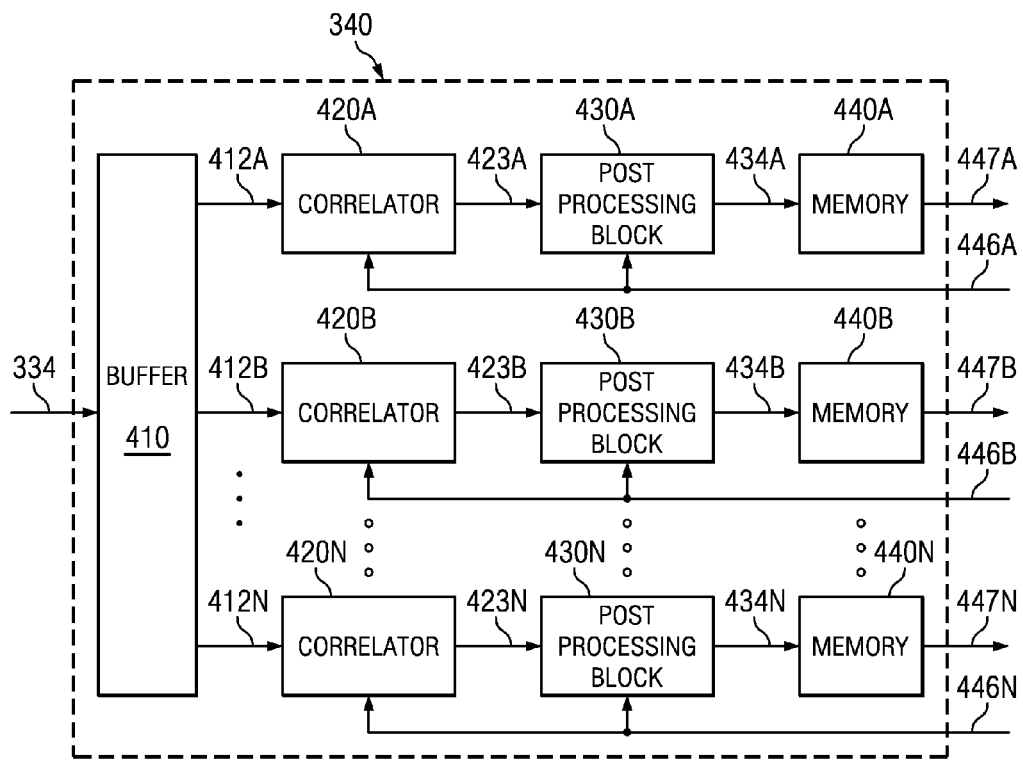
FIG. 4A is a block diagram illustrating the internal details of a baseband processing block of a GNSS receiver in an embodiment.

FIG. 4A is a block diagram illustrating the internal details of a baseband processing block of a GNSS receiver in an embodiment. Baseband processing block 340 is shown containing buffer 410, correlators 420A-420N, post processing blocks 430A-430N and memory 440A-440N. It must be understood that the details of baseband processing block 340 shown in FIG. 4A are provided merely by way of illustration. In other embodiments, baseband processing block 340 may be implemented according to several other techniques, well-known in the relevant arts. Each block/component of FIG. 4A is described below in detail.

Buffer 410 receives in a streaming fashion (i.e., continuously as the samples are generated), samples on path 334 from decimation block 330 (FIG. 3A). Buffer 410 stores (buffers) the samples, and provides the samples (a same set/sequence of samples) to each of correlators 420A-420N via corresponding paths 412A-412N. The set of such samples sent in one lot to the correlators is referred to as 'window samples' hereafter. Typically, the window samples constitute a set of samples representing the baseband (down-converted received) GNSS signal for a duration of a multiple or sub-multiple of a code period, although other sizes can be used. In an embodiment, buffer 410 is implemented as a circular buffer, with new samples being stored starting at the beginning of buffer 410 when buffer 410 is filled.

The size/capacity of buffer 410 (number of digital code samples that can be stored in buffer 410) is often based on various considerations such as cost, area, as well as the code period in relation to a data bit period, as described below.

Each of correlators 420A-420N performs a correlation operation of the samples received from buffer 410 with a corresponding local signal (represented by local digital samples). For example, correlator 420A may be used to perform correlation of the samples with a locally generated signal corresponding to signal 121 transmitted by satellite 120 (by using the same code as that used by satellite 120 and a carrier) and correlator 420B may be used in relation to signal 131 (by using the code used by satellite 130 and carrier) etc. Each of the other correlators correlates the samples with corresponding locally generated signals. Alternatively, multiple correlators may be used to correlate with the same transmitted signal at least for a small duration of the operation.

In general, the specific code received from processor 350 determines the specific transmitted GNSS signal, which is searched for. As is well known, the set of codes is fixed by the corresponding GNSS standard, and each transmitter is uniquely assigned one of the codes. Thus, processor 350 can cause the signal transmitted by a corresponding transmitter to be searched by assigning the related code to the specific one of the correlators. Each correlator may be assigned a different one of the codes to use in the search.

Although not shown in FIG. 4A, it is assumed that the circuitry for generating each of the locally generated signals is contained within the respective correlators 420A-420N. For example, each correlator may contain a local code generator. Local carrier Doppler coefficients (for generating local carrier) may also be generated within each correlator using a phase accumulator, well known in the relevant arts. Further, each correlator may contain within it multiple signal paths, with respective paths performing correlations on I and Q components of the signal on path 334 with corresponding local I and Q signals. Detailed description of such techniques is not provided in the interest of conciseness, and also as these are well known in the relevant arts.

Figure 4B:
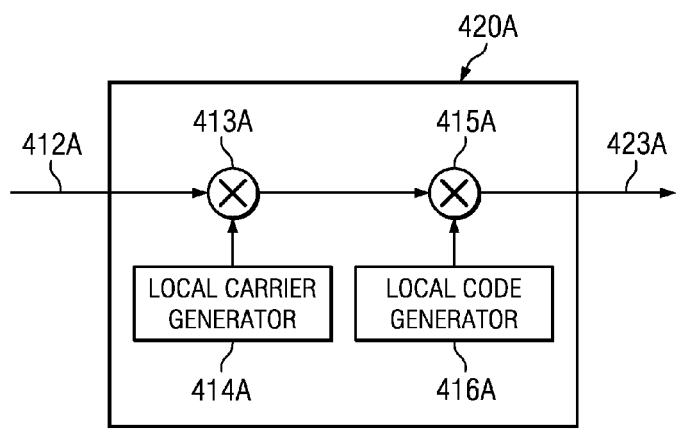
FIG. 4B is a block diagram of internal details of one of correlators 420A-420N shown in FIG. 4A.

Each correlator 420A-420N provides the result of each correlation operation to the corresponding one of post processing blocks 430A-430N via respective paths 423A-423N. A single correlation value may be provided for each window samples. Correlators 420A-420N receive control commands from processor 350 via respective paths 446A-446N. FIG. 4B is a block diagram of internal details of one of correlators 420A-420N shown in FIG. 4A. Correlator 420A has a first input of a first multiplier 413A coupled to path 412A, an output of a local carrier generator 414A coupled to a second input of first multiplier 413A, an output of first multiplier 413A coupled to a first input of a second multiplier 415A, an output of a local code generator 416A coupled to a second input of second multiplier 415A, and an output of second multiplier 415A coupled to path 423A. While correlator 420A was identified in FIG. 4B, the internal make up of correlator 420A is representative of the remaining correlators 420B-420N.

Each of post processing blocks 430A-430N receives commands (from processor 350) via corresponding paths 446A-446N. Each of post processing blocks 430A-430N performs coherent (no bit flips in between) and/or non-coherent (bit flips present) accumulation of the correlation results (output of the corresponding correlator) received on corresponding paths 423A-423N.

Post processing blocks 430A-430N also remove code Doppler less than one sampling period using interpolation techniques. Respective code Dopplers more than one sampling period duration are removed by de-rotating the local code in the corresponding correlator. Post processing blocks 430A-430N store via respective paths 434A-434N the coherent and non-coherent accumulation results in corresponding memory 440A-440N. Processor 350 (FIG. 3) may read the results (correlation/accumulation) from memory 440A-440N via paths 446A-446N. Paths 446A-446N and 447A-447N are deemed to be contained in path 345 of FIG. 3.

For reasons of implementation area, cost, etc., it may be desirable that buffer 410 have as small a size as possible. However, in addition, at least for performing multiple parallel Doppler and code phase searches in parallel, the size of buffer 410 may need to be selected based on other factors such as the relationship between the corresponding code period and data bit period, as illustrated next with an example.

6. Buffer Size

Figure 5:
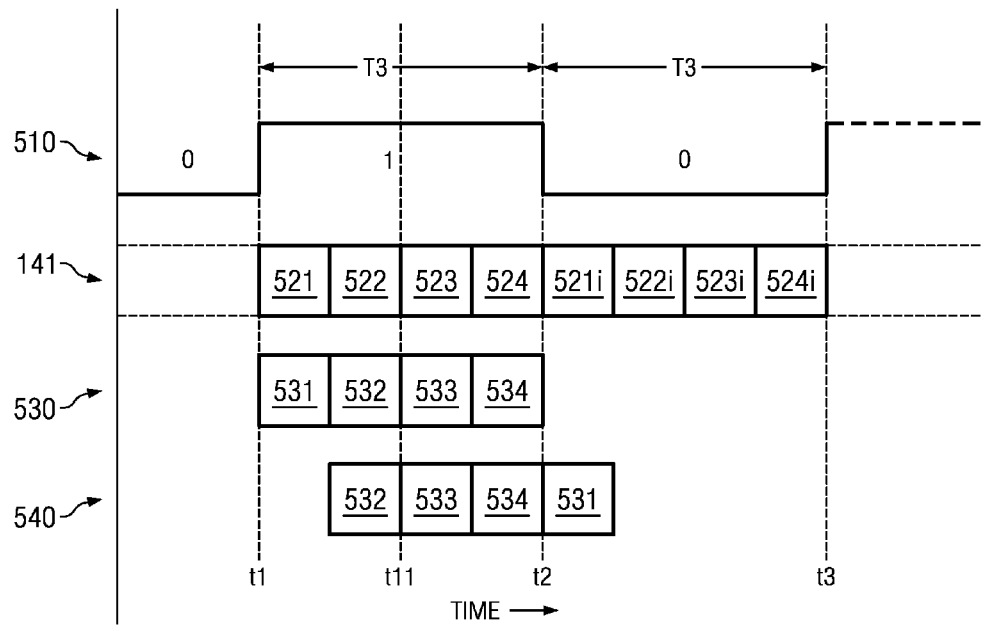
FIG. 5 is a timing diagram used to illustrate how code and data bit periods may affect the selection of buffer size when a GNSS receiver performs Doppler and code phase searches.

FIG. 5 is a timing diagram used to illustrate how code and data bit periods may affect the selection of buffer size when a GNSS receiver performs multiple Doppler and code phase searches in parallel. Merely for illustration, the following description is provided assuming that the environment of FIG. 1 corresponds to Galileo system, in which each of GNSS transmitters (satellites) 120, 130, 140 and 150 transmit GNSS signals 121, 131, 141 and 151 respectively according to Galileo specifications. GNSS Receiver 110 is assumed to be capable of receiving GNSS signals. Waveform 510 (contained in signal 141) represents the data bits transmitted by GNSS transmitter 140.

For simplicity, the following description is provided with respect only to signal 141. Time interval T3 represents one code period of the code of signal 141. According to Galileo specifications, a data bit period and a code period are both equal to 4 ms (T3) and thus the window samples correspond to one entire code period.

Accordingly, as shown in FIG. 5, each data bit in waveform 510 has a period equal to the period of code 141. Down-converted signal 141 (after down-conversion, and as contained in path 334, but referred to simply as signal 141 hereafter) is in turn shown containing portions 521 through 524 together corresponding to an interval (t1-t2) when the data bit is a logic 1, and portions 521i through 524i when the data bit in the corresponding interval (such as t2-t3) is a logic 0. The individual code bits of signal 141 in code portions 521-524 are respectively the inverse of the code bits in code portions 521i-524i. Though shown as a separate waveform 510 merely for understanding, it should be appreciated that waveform 510 is a representation within signal 141.

To perform a Doppler search, receiver 110 generates local signal 530 using a replica of code 141 and an estimate, e.g., "fc1", of the carrier Doppler frequency. Waveform 530 is shown containing portions 531-534. The length of waveform 530 (t1 to t2) is equal to one code period (4 ms) of code 141. Replica code 141 in waveform 530 is assumed to have a phase P1. GNSS receiver 110 performs a correlation of portions 521-524 with corresponding portions 531-534 respectively to perform a first Doppler search (or search for the first Doppler frequency).

GNSS receiver 110 may generate another local signal 540 containing a different carrier Doppler "fc2" but with a replica code 141 with the phase shifted. As an illustration, it may be observed that the shift causes portion 531 to be the last portion in signal 540, while it is in the first position in signal 530. GNSS receiver 110 correlates waveform 540 with corresponding portions 522, 523, 524 and 521i of signal 141 to perform a second Doppler search.

Though not shown in the Figure, receiver 110 may also perform code phase searches before searching a next Doppler. For such code phase searches, GNSS receiver 110 may generate another local signal (not shown) containing a local carrier "fc2" but with code phase P3 of replica code 141 for processing all the code phase searches for a single Doppler frequency hypothesis.

Since there is no data bit transition during correlation of waveform 530 with the corresponding portions 521-524, there is no correlation loss. However, due to the data bit change at time instance t2, correlation of waveform 540 (during a Doppler search) with the corresponding portions 522, 523, 524 and 521i results in a correlation loss. In general, correlation loss occurs when bit boundaries are straddled as shown at t2.

Assuming the size of buffer 410 (FIG. 4) is chosen to be exactly wide enough to store samples corresponding to one code period (T3), for carrier Doppler searches buffer 410 will contain portions 521-524 corresponding to correlation operation with local signal 530, and portions 522, 523, 524 and 521i corresponding to correlation operation with local signal 540.

While a buffer size exactly wide enough to store one code period (4 ms in the above example) worth of samples of a received GNSS signal may be desirable to minimize cost and area, such an approach may not be adequate due to the problem noted above. This problem may not cause significant loss in case of GPS signal since the data bit flip happens once after 20 ms (frames) but may be significant for Galileo because of its signal structure (code period being equal to the data bit period). The approach described above may not lend to hybrid solutions providing both GPS and Galileo/Waas receiver capabilities.

Specifically, as described above, correlation losses may occur due to data bit transitions. Further, since such transitions may occur for every frame (typically one code period length worth of correlation), correlation loss may be significant. As a result, Doppler search operations may be adversely affected. In particular, it may not be possible for receiver 110 to perform multiple Doppler and code phase search in parallel. A prior approach to search wider Doppler bandwidths is to perform shorter coherent integrations (i.e., correlation for shorter periods of time, sometimes even less than one frame). But such approaches suffer from sensitivity loss and reduced processing gain, and may require more number of non-coherent accumulations (correlation results which may contain bit flips) due to the increased loss during non-coherent accumulation. As a result more time may be required for acquisition.

It is noted here that while in the context of GPS, a buffer size exactly wide enough to store one code period (1 ms in the case of GPS signals) may be adequate (since a data bit period of GPS data is 20 ms), a similar approach may not be adequate in the context of Galileo signals, as illustrated above. A similar problem may be present in other operational environments, including WAAS.

One possible solution is to size buffer 410 to be exactly wide enough to store samples for a duration equal to two (8 ms) code periods. One 4 ms portion of samples may be stored in one half of the buffer, while new incoming samples are stored in the other (second) half. Thus, a static 4 ms length of samples is available for performing multiple Doppler hypotheses till the second half becomes full, i.e. for a period of 4 ms.

However, since the data bit boundaries of data in signals 121, 131, 141 and 151 in general do not occur at the same time instances (or code phases are different for different GNSS signals), the above solution may require "two code period length" buffers for each of the signals 121, 131, 141 and 151. Thus, assuming N correlators are present (to process N signals individually), a total of 2N code period length of buffer may be required. Such an approach may not be desirable due to increased implementation area and/or cost.

Several aspects of the present invention overcome one or more of the problems noted above, as described in detail next.

7. Buffer Architecture

Figure 6:
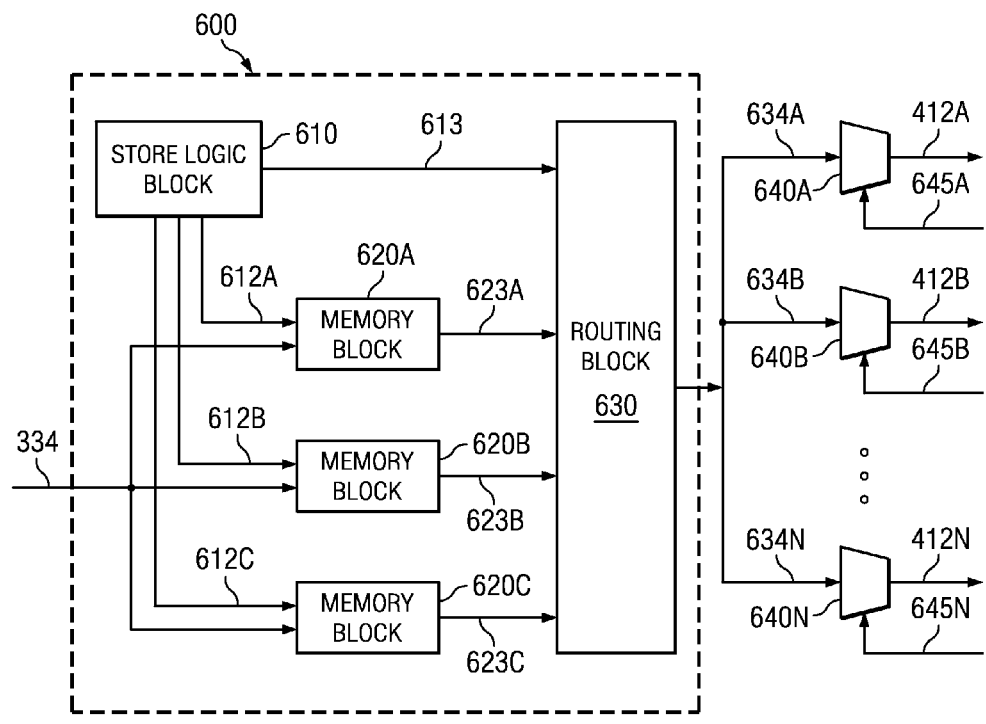
FIG. 6 is a block diagram of a buffer memory (buffer) used to store samples of a GNSS signal in an embodiment of the present invention.

FIG. 6 is a block diagram of a buffer memory (buffer) used to store samples of a GNSS signal in an embodiment of the present invention. Merely for illustration, it is assumed in the following description that buffer 600 of FIG. 6 is contained in baseband processing block 340 of GNSS receiver 110 (FIG. 3A). However, buffer 600 may be implemented external to baseband processing block 340, or in a GNSS receiver implemented using other approaches as well. Buffer 600 is shown containing store logic block 610, memory blocks 620A, 620B and 620C, routing block 630, and multiplexers 640A-640N. Each block is described in detail below.

Each of memory blocks 620A, 620B and 620C receives samples on path 334, and stores the samples if the corresponding enable signal on paths 612A, 612B and 612C respectively is active (enabled). In an embodiment, each of memory blocks 620A, 620B and 620C has a size exactly required to store one code period worth of samples generated by ADC 330. In the context of Galileo system, each of memory blocks 620A, 620B and 620C has a size equal to store 4 ms worth of samples generated by ADC 330.

In alternative embodiments, the size of the memory blocks is made equal to the size of samples for one code period of the corresponding signal. For example, in the context of both WAAS and GPS the size of each of the memory blocks is made equal to the size of samples for 1 ms duration (1 ms being the code period of WAAS as well as GPS codes). Although shown as separate units, memory blocks 620A, 620B and 620C may be implemented as a single unit as well.

Routing block 630 provides (streams) samples (received via paths 623A, 623B and 623C) from two filled memory blocks of the three memory blocks 620A, 620B and 620C on each of paths 634A through 634N. The set of samples provided on each of these paths 634A through 634N as a continuous stream is referred to as window samples. It may be appreciated that the window samples contains samples corresponding to more than one code period or less than one code period in the alternative embodiments described in sections below.

Routing block 630 receives indication of which two memory blocks are filled from store logic block 610 via path 613. Therefore, routing block 630 simultaneously streams on respective paths 634A-634N (serially, and in the same chronological order in which the samples are received on path 334 and stored into the corresponding memory blocks) two code period worth of samples. Thus, in the context of Galileo system, routing block 630 provides 8 ms worth of samples (simultaneously) on each of paths 634A-634N, and 2 ms worth of samples in the context of GPS and WAAS. The samples thus provided are referred to as window samples, as noted above.

Each of multiplexers 640A through 640N selects a corresponding window samples from the samples received from routing block 630. The specific set of samples selected by each multiplexor 640A-640N depends on the specific duration (between a start time instance and an end time instance) for which the corresponding select signal 645A-645N is asserted. In general, each select signal is asserted such that a corresponding windows samples does not contain a data bit transition for multiple Doppler searches as described in further detail with respect to FIG. 7 as well.

Multiplexers 640A-640N forward the corresponding window samples to respective correlators via paths 412A-412N. Select signals 645A-645N may be received from respective correlators 420A-420N (though not shown in FIG. 4A), and may be determined/activated in a known way, for example, based on code phase to be searched for a particular satellite. For example, within the corresponding two memory blocks, code frame (one code period) corresponding to transmitter 120 may start from the "n"th sample, whereas that for transmitter 130 may start from the "m"th sample.

Assuming correlator 420A is used for searching signal 121 (from transmitter 120) and correlator 420B is used for searching signal 131 (from transmitter 130), correlator 420A will activate select signal 645A starting at a time instance (and for a corresponding duration of one code period) corresponding to the nth sample being streamed into multiplexer 640A. Correlator 420B may in a similar fashion activate select signal 645B starting at a time instance (and for a corresponding duration of one code period) corresponding to the mth sample being streamed into multiplexer 640B.

Store logic block 610 provides enable signals on paths 612A, 612B and 612C to enable/disable storing of samples on path 334 into memory blocks 620A, 620B and 620C. In an embodiment, store logic block 610 generates enable signals to store samples in memory blocks 620A, 620B and 620C in a cyclical fashion (circular buffer fashion).

To illustrate, assuming all three memory blocks 620A, 620B and 620C are empty initially, store logic block 610 first enables memory block 620A to receive and store samples. Once memory block 620A is filled, store logic block 610 disables input to memory block 620A, and enables memory block 620B till memory block 620B is filled. Once memory block 620B is filled, store logic block 610 disables input to memory blocks 620A and 620B, and enables memory block 620C till memory block 620C is filled. Then, store logic block 610 enables memory block 620A to receive new samples, and so on. Thus, in a steady state, while one memory block is being filled, the remaining two would have previously stored samples, which are provided to each of the correlators 420A-420N.

Store logic block 610 may receive inputs (not shown) from each of memory blocks 620A, 620B and 620C indicating whether or not the respective memory blocks are filled. Alternatively, store logic block 610 may maintain a count of the samples as they are being stored in the respective memory blocks to enable it to generate the required enable signals 612A/612B/612C. Store logic block 610 also provides a control signal on path 613 to routing block 630 specifying which two of memory blocks 620A, 620B and 620C is filled. Store logic block 610, memory blocks 620A, 620B and 620C and routing block 630 may be implemented in a know way.

It may be appreciated that since each of correlators 420A-420N receives two code period worth of samples on corresponding input paths 412A-412N, this ensures that at least one code period worth of samples within the two code period of samples does not straddle a bit boundary. As a result, the correlators can perform multiple Doppler and/or code phase searches while the third memory block is being filled thereby permitting fast Doppler search, as described next with illustrative examples.

8. Multiple Doppler and Code Phase Searches

Figure 7A:
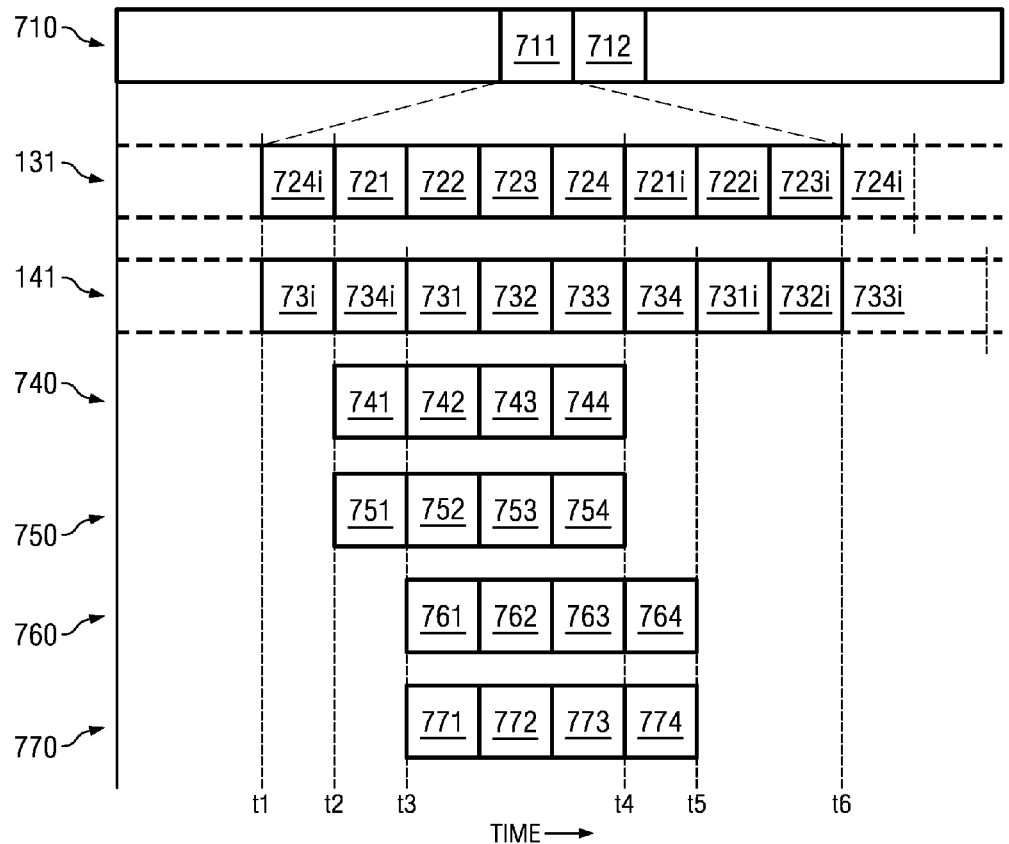
FIGS. 7A and 7B are timing diagrams illustrating the manner in which multiple Doppler and code phase searches can be performed using correlators in an embodiment of the present invention.
Figure 7B:
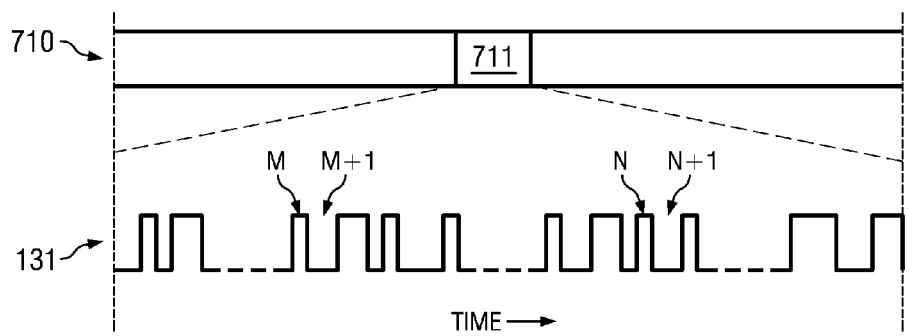

FIGS. 7A and 7B are timing diagrams illustrating the manner in which multiple Doppler and Code phase searches can be performed using each of the correlators in an embodiment of the present invention. Merely for illustration the following description is provided with respect to the environment of FIG. 1 and the structure of FIG. 6 in the context of a Galileo system.

In FIG. 7A, waveform 710 represents a down-converted received GNSS signal (path 334), and may contain one or more of (down-converted) transmitted GNSS signals 121, 131, 141 and 151. Further, it may be readily noted that signal 710 is to one scale, while the rest of the signals (expanded) are to a different scale. Also, though shown as separate waveforms (sample values) for ease of understanding, both 131 and 141 represent the same samples received from decimation block 330.

In the following description, it is assumed that waveform 710 contains at least down-converted signals 131 and 141 (referred to hereafter simply as signals 131 and 141 respectively). It is also assumed that portion 711 is stored in two filled memory blocks (any two of memory blocks 620A, 620B and 620C). Store logic block 610 and routing block 630 provide portion (duration) 711 to all the correlators, while storing newer samples corresponding to a next 4 ms portion 712 in the third as yet not-full memory block.

Bit changes (bit boundaries) in signal 131 are shown as occurring at t2 and t4. Bit changes in signal 141 are shown as occurring at t3 and t5. Signal portion 711 of waveform 710 represents two code period durations (t1 to t6), i.e. 8 ms. Signal 131 in duration 711 is shown containing portions 724$i$, 721, 722, 723, 724, 721$i$, 722$i$ and 723. Signal 141 in duration 711 is shown containing portions 733$i$, 734$i$, 731, 732, 733, 734, 731$i$ and 732$i$, with each portion having a duration 1 ms.

Since bit changes in signal 131 occur at time instances t2 and t4, bits in portions 724$i$, 721$i$, 722$i$ and 723$i$ are the complement (inverse) of the bits in portions 724, 721, 722 and 723. Similarly, since bit changes in signal 141 occur at time instances t3 and t5, bits in portions 731$i$, 732$i$, 733$i$ and 734$i$ are the complement (inverse) of the bits in portions 731, 732, 733 and 734.

It may appreciated that each of signals 131 and 141 in duration 711 will contain at least one code period section (for example, the section as shown between time instances t2 and t4 in FIG. 7) in which there is no bit change. Samples in the duration 711 may, as an example, be stored in memory blocks 620A and 620B, while newer samples are stored in memory block 620C.

Routing block 630 thus provides samples in duration 711 on each of paths 634A-634N, with the respective multiplexers 640A-640N selecting only a single 4 ms portion. Thus, bit samples corresponding to 721-724 may be provided to correlator 420A, while portions 731-734 (received in a different duration) are provided to correlator 420B. Each of the correlators can use its own code (without rotation) and perform multiple Doppler searches on the corresponding received window samples as described below in further detail.

A local signal 740 corresponding to signal 131 is generated first using a carrier frequency fc1 and a code phase P5 (phase starting with portion 741 in FIG. 7). One correlation is performed by correlating local signal 740 with corresponding portions 721-724 of signal 131, which may, for example correspond to samples (n to n+4091, assuming a Galileo system) in portion 711. This correlation with signal 740 and portions 721-724 of signal 131 represents one iteration for a carrier Doppler search (with frequency fc1).

For a next Doppler search, local signal 750 is generated using code phase P5 (i.e., without rotation or phase change of local code) with a carrier frequency fc2, and a correlation for a Doppler search is performed by correlating local signal 750 with corresponding portions 721-724 of signal 131 (samples n to n+4091 of portion 711). Further Doppler searches with corresponding carries frequencies can be similarly performed.

Thus, each correlator can perform multiple Doppler searches on the same corresponding received window samples, which in turn implies based on the same stored bits (being made available to each of the correlators). Each of the correlators can similarly be designed to perform multiple code phase searches based on each of set of samples (711) stored in buffer as described next with respect to FIG. 7B.

FIG. 7B is shown containing multiple bit samples corresponding to the total samples (711) stored and made available to each of the correlators. M, M+1..., N+1, etc., correspond to the bit positions in the sequence of stored samples corresponding to 711. It is conveniently assumed that between M and N (inclusive of both), there are 4 milliseconds worth of samples.

Broadly, routing block 630 (FIG. 6) provides the same 8 ms (711) worth samples on all paths 634A-634N (at least the ones performing multiple code phase searches). However, the multiplexors presently facilitating code phase search, would select 4 ms worth of samples starting from a position indicated by the corresponding select signal. The select signal in turn is asserted to correspond to the desired phase for which the search is being conducted in a present iteration.

Thus, in one iteration, samples M through N may be selected, and samples (M+1) through (N+1) may be selected in a subsequent iteration for an incremental phase change. Samples in positions (M−1) through (N−1) may also be selected for a corresponding phase change. In general, samples starting from any desired position can be selected depending on the specific phase being searched in a present iteration.

It should be appreciated that the number of times the 8 ms worth of samples are sent to the multiplexors merely depends on the speed with which a single code phase search can be performed by the correlators and the speed with which the various internal components can be loaded (with the received bits) and other initializations performed.

Thus, using the set of stored samples, multiple code phase searches can also be performed due to the buffer architecture described above (since the 2 code periods worth of samples are stored in the above described embodiment). For the same reason, multiple Doppler searches also can be performed, as described above. It may be appreciated that the same sample portions 721-724 (i.e., a same window samples) are used for both (in general multiple) Doppler searches (carrier frequencies fc1 and fc2 in the above example) while new incoming samples are stored in the third buffer as noted above. It may also be appreciated that the portions 721-724 are available to correlator 420A for a period of 4 ms, i.e., till the third unfilled buffer is filled, and a new 4 ms set of corresponding samples is provided by the corresponding multiplexor 640A.

Merely for ease of understanding, the Doppler and Code phase searches are described separately. However, it should be appreciated that the searches described above can be used in various combinations, as illustrated below with some examples.

The correlators may perform multiple Doppler searches and one code phase search with one window samples received. For example, as noted above, correlator 420A may generate local signal 740 using a carrier frequency fc1 and a code phase P5, and perform one carrier Doppler search iteration by correlating local signal 740 with portions 721-724 of signal 131. Correlator 420A may perform subsequent iterations of Doppler searches by generating local signals with the same code phase P5 but different carrier frequencies fc2, fc3 etc.

The correlators may receive multiple window samples for the same stored samples, and perform multiple code phase searches for the same stored samples, in combination with none, one or more Doppler searches. For example, correlator 420A may perform multiple Doppler searches using window samples containing portions 721-724 of signal 131, and local signals with different carrier frequencies, as noted above. Correlator 420A may perform multiple code phase searches with different window samples (with each starting and ending at different positions in samples 711), with a same local signal (same carrier frequency and local code).

In general, any desired combination of Doppler and code phase searches can be used to acquire the corresponding GNSS signal. Once code phase is aligned and carrier frequency Doppler error is resolved, the code and carrier tracking loops may be executed to track the signal (maintain lock by making slight adjustments to the local code phase and local carrier frequency). In addition, the data in each GNSS signal may be recovered by accumulating correlation results and determining the sign of the results, as is well known in the relevant arts. Alternatively, other well-known techniques may be used to recover the data.

It may be further appreciated that the Doppler searches are performed without local code rotation. In the example above, the same code phase (but combined with different carrier frequencies) is used in local signals 740 and 750. Due to use of the same code phase of the local code, computational complexity may be reduced.

Further, the multiple searches are performed in "parallel" in that a same total set of samples (corresponding to a same portion of received GNSS signal, portion 711 in the example of FIG. 7) is used for performing the multiple searches. It may be appreciated such multiple parallel searches may not be possible using the prior approach noted above.

Any of the other correlators may similarly perform Doppler and code phase searches for signal 141 using local signals 760 and 770 and corresponding portions of signal 141 in a manner similar to that noted above with respect to signal 131. Thus, using the approach described above, multiple Doppler and code phase searches may be performed. As may be appreciated, correlation losses do not occur during Doppler searches since the signal samples used to perform the corresponding correlations do not straddle a data bit boundary.

The technique described above supports acquisition in cold start and hot start/assisted modes, and also during tracking. The technique specifically enables hot start mode acquisition to be performed efficiently. Further, a buffer memory architecture implemented as described above may be used to support different environments such as GPS, WAAS and Galileo, (or a hybrid combination of GPS, WAAS and Galileo) with corresponding changes to the sizes of memory blocks, logic in store logic block 610 and routing block 630 and multiplexers 640A-640N.

In certain environments, it may be desirable to further reduce the memory capacity of buffer 600 using alternative processing techniques. An embodiment of buffer 600 implemented to store less than one code period worth of samples is described next also with respect to FIG. 6.

9. Alternative Embodiment

In an alternative embodiment, each of memory blocks 620A, 620B and 620C of buffer 600 of FIG. 6 is implemented to have a size less than one code period worth of samples.

As an example, in an embodiment implemented in the context of Galileo system, each of memory blocks 620A, 620B and 620C is implemented with a size to store 1 ms worth of samples. A correlation operation which generally (as described above) correlates 4 ms worth of samples is performed in four steps, with each step performing correlation on 1 ms worth of samples.

Store logic block 610 generates enable signals to store samples in memory blocks 620A, 620B and 620C in a cyclical fashion (circular buffer fashion), as in the embodiment described above, except that each memory block is 1 ms wide ($1/4^{th}$ of the code period in the case of Galileo System). Store logic block 610 and routing block 630 stream 2 ms worth of samples on paths 634A-634N from any two of filled memory blocks 620A, 620B and 620C, while storing newer samples in the third as yet not-full memory block, in a manner similar to that described above.

Each multiplexor selects a corresponding 1 ms portion within the streamed 2 ms worth of samples, performs a partial correlation using the 1 ms portion, and stores the partial result internally (within the correlator). Alternatively, the partial correlation result may also be stored in the corresponding post processing block 430A-430N or external to baseband processing block 340. Multiple (partial) Doppler and code phase searches are performed using the selected 1 ms samples. It may be appreciated that each correlator has a 1 ms interval of time (while the third buffer is being filled) in which the multiple searches can be performed.

A next 2 ms worth of samples is streamed from the next pair of filled buffers in a cyclical fashion, and the partial correlations and partial searches are repeated. In general, the results of each partial correlation is stored and when a corresponding partial result for the remaining portion is received later, the correlation value for the entire code period is generated by adding the respective (four, in the above illustrative example) partial results, and can be performed in a known way.

While the above description is provided assuming samples corresponding to $1/4$ of code period is provided each time for illustration, alternative embodiments can be implemented with a different fraction (e.g., half) of the code period. In such instances a partial result would be generated for the corresponding fraction and the aggregate correlation result would be generated by adding the multiple partial results for all the portions corresponding to a code period. Such a feature is made possible since transition is aligned with the start of the first one of the samples portions (corresponding to fraction of the code period).

Thus, several aspects of the present invention minimize the buffer size required to receive/store samples of a GNSS signal in a receiver, while reducing the correlation sensitivity to data bait transitions. It may be appreciated that the techniques of the present invention provide to correlators in a GNSS receiver signal portions that do not straddle bit boundaries, thereby enabling the correlators to perform multiple Doppler and code phase searches on a single set of samples.

Also, in this application the term A and/or B implies A or B or (A and B together).

10. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A Global Navigation Satellite System (GNSS) receiver to process GNSS signals, each GNSS signal being generated in a transmitter by modulating a signal carrier with a combined value, wherein said combined value is generated by combining a corresponding one of a set of different codes with a corresponding data value to be transmitted in the corresponding transmitter, said GNSS receiver comprising:

an analog to digital converter (ADC) to receive an input signal containing a plurality of GNSS signals and to generate a sequence of samples respectively representing a strength of said input signal at corresponding time instances, said plurality of GNSS signals including a GNSS signal from a first satellite;

a correlator to examine a set of samples to generate a correlation result indicating a similarity between a local signal and a portion of said GNSS signal represented by said set of samples, said set of samples being received in a window samples and said local signal being generated by modulating a local carrier signal with a local code equaling one of said set of codes;

a buffer provided between said ADC and said correlator, said buffer to store more than said set of samples and to provide some of the stored set of samples as said window samples; and a processor to examine said correlation result and controlling a frequency of said local carrier signal and/or a phase of said local code search for code phase and Doppler frequency on said GNSS signal.

2. The GNSS receiver of claim 1, wherein said GNSS receiver comprises a plurality of correlators including said correlator, said GNSS receiver further comprising:

a plurality of multiplexors each to receive all samples stored in said buffer and selectively forwarding only a corresponding one of a plurality of sets of samples to each of said plurality of correlators as a corresponding one of a plurality of window samples, wherein searches are performed using the same local code without rotation in each of said correlators while performing said search for code phase and Doppler frequency.

3. The GNSS receiver of claim 2, wherein said correlator is designed to perform a plurality of searches for Doppler frequency on said set of samples, wherein said plurality of window samples does not contain different samples/bits representing different data values during said plurality of searches for Doppler frequency.

4. The GNSS receiver of claim 3, wherein said processor searches for a correct one of a set of codes used by said transmitter by providing each of said set of codes as the local code to said correlator and examining a correlation result received in response.

5. A Global Navigation Satellite System (GNSS) receiver to process GNSS signals, each GNSS signal being generated in a transmitter by modulating a signal carrier with a combined value, wherein said combined value is generated by combining a corresponding one of a set of different codes with a corresponding data value to be transmitted in the corresponding transmitter, said GNSS receiver comprising:

an analog to digital converter (ADC) to receive an input signal containing a plurality of GNSS signals and to generate a sequence of samples respectively representing a strength of said input signal at corresponding time instances, said plurality of GNSS signals including a GNSS signal from a first satellite;

a plurality of correlators each to examine a set of samples to generate a correlation result indicating a similarity between a local signal and a portion of said GNSS signal represented by said set of samples, said set of samples being received in a window samples and said local signal being generated by modulating a local carrier signal with a local code equaling one of said set of codes, wherein each correlate is designed to perform a plurality of searches for Doppler frequency on said set of samples, wherein said plurality of samples do not contain different samples/bits representing different data values during said plurality of searches for Doppler frequency;

a buffer provided between said ADC and said correlators, said buffer to store more than said set of samples and to provide some of the stored set of samples as said window samples;

a plurality of multiplexors each to receive samples stored in said buffer and selectively forwarding only a corresponding one of a plurality of sets of samples to each of said plurality of correlators as a corresponding one of a plurality of window samples, wherein searches are performed using the same local code without rotation in each of said correlators while performing said search for code phase and Doppler frequency, wherein a corresponding one of said plurality of multiplexors selects a corresponding set of samples to be forwarded to the corresponding correlate, in response to a plurality of select signals asserted for a duration, wherein each of said plurality of select signals is asserted such that none of said window samples would contain different bits representing multiple data values for plurality of doppler frequency searches; and a processor to examine said correlation results and controlling a frequency of said local carrier signal and/or a phase of said local code search for code phase and Doppler frequency on said GNSS signal.

6. A Global Navigation Satellite System (GNSS) receiver to process GNSS signals, each GNSS signal being generated in a transmitter by modulating a signal carrier with a combined value, wherein said combined value is generated by combining a corresponding one of a set of different codes with a corresponding data value to be transmitted in the corresponding transmitter, said GNSS receiver comprising:

an analog to digital converter (ADC) to receive an input signal containing a plurality of GNSS signals and to generate a sequence of samples respectively representing a strength of said input signal at corresponding time instances, said plurality of GNSS signals including a GNSS signal from a first satellite;

a plurality of correlators each to examine a set of samples to generate a correlation result indicating a similarity between a local signal and a portion of said GNSS signal represented by said set of samples, said set of samples being received in a window samples and said local signal being generated by modulating a local carrier signal with a local code equaling one of said set of codes;

a buffer provided between said ADC and said correlators, said buffer to store more than said set of samples and to provide some of the stored set of samples as said window samples;

a plurality of multiplexors each to receive samples stored in said buffer and selectively forwarding only a corresponding one of a plurality of sets of samples to each of said plurality of correlators as a corresponding one of a plurality of window samples, wherein searches are performed using the same local code without rotation in each of said correlators while performing said search for code phase and Doppler frequency:

wherein each correlate is designed to perform a first search on first window samples and a second search on second window samples to perform a code phase search;

wherein first window samples and said second window samples start from different positions of the stored samples such that each correlate performs said first search and said second search with the same corresponding local code without rotation; and wherein said first window samples and said second window samples are contained in the same set of samples stored in said buffer in a corresponding time duration; and a processor to examine said correlation results and controlling a frequency of said local carrier signal and/or a phase of said local code search for code phase and Doppler frequency on said GNSS signal.

7. The GNSS receiver of claim 2, wherein said buffer comprises memory blocks to store samples corresponding to more than two code period durations of said input signal, wherein said buffer provides samples corresponding to two code period durations and wherein each of said plurality of multiplexors selects corresponding windows samples equaling samples of a single code period duration.

8. A Global Navigation Satellite System (GNSS) receiver to process GNSS signals, each GNSS signal being generated in a transmitter by modulating a signal carrier with a combined value, wherein said combined value is generated by combining a corresponding one of a set of different codes with a corresponding data value to be transmitted in the corresponding transmitter, said GNSS receiver comprising:

an analog to digital converter (ADC) to receive an input signal containing a plurality of GNSS signals and to generate a sequence of samples respectively representing a strength of said input signal at corresponding time instances, said plurality of GNSS signals including a GNSS signal from a first satellite;

a plurality of correlators to examine sets of samples to generate a correlation result indicating a similarity between a local signal and a portion of said GNSS signal represented by said set of samples, said set of samples being received in a window samples and said local signal being generated by modulating a local carrier signal with a local code equaling one of said set of codes;

a buffer provided between said ADC and said correlator, said buffer to store more than said set of samples and to provide some of the stored set of samples as said window samples, wherein said buffer comprises memory blocks to store samples corresponding to more than two code period durations of said input signal, wherein said buffer provides samples corresponding to two code period durations, and, wherein said buffer comprises three memory blocks, each to store samples worth one code period each;

a plurality of multiplexors each to receive all samples stored in said buffer and selectively forwarding only a corresponding one of a plurality of sets of samples to each of said plurality of correlators as a corresponding one of a plurality of window samples, wherein searches are performed using the same local code without rotation in each of said correlators while performing said search for code phase and Doppler frequency, wherein each of said plurality of multiplexors selects corresponding windows samples equaling samples of a single code period duration;

a store logic block operating to ensure two of said three memory blocks together have two consecutive codes worth of samples, while a third memory block receives and stores presently received samples from said ADC; and a routing block to send said two consecutive codes worth of samples to each of said plurality of multiplexors; and a processor to examine said correlation result and controlling a frequency of said local carrier signal and/or a phase of said local code search for code phase and Doppler frequency on said GNSS signal.

9. The GNSS receiver of claim 2, wherein said buffer comprises at least one memory block to store samples corresponding to less than one code period duration of said input signal.

10. A Global Navigation Satellite System (GNSS) receiver to process GNSS signals, each GNSS signal being generated in a transmitter by modulating a signal carrier with a combined value, wherein said combined value is generated by combining a corresponding one of a set of different codes with a corresponding data value to be transmitted in the corresponding transmitter, said GNSS receiver comprising:

an analog to digital converter (ADC) to receive an input signal containing a plurality of GNSS signals and to generate a sequence of samples respectively representing a strength of said input signal at corresponding time instances, said plurality of GNSS signals including a GNSS signal from a first satellite;

a plurality of correlators to examine sets of samples to generate a correlation result indicating a similarity between a local signal and a portion of said GNSS signal represented by said set of samples, said set of samples being received in a window samples and said local signal being generated by modulating a local carrier signal with a local code equaling one of said set of codes;

a buffer provided between said ADC and said correlator, said buffer to store more than said set of samples and to provide some of the stored set of samples as said window samples, said buffer comprising at least one memory block to store samples corresponding to less than one code period duration of said input signal;

a plurality of multiplexors each to receive samples stored in said buffer and selectively forwarding only a corresponding one of a plurality of sets of samples to each of said plurality of correlators as a corresponding one of a plurality of window samples, wherein searches are performed using the same local code without rotation in each of said correlators while performing said search for code phase and Doppler frequency;

a processor to examine said correlation result and controlling a frequency of said local carrier signal and/or a phase of said local code search for code phase and Doppler frequency on said GNSS signal; and wherein said buffer provides (2/N) stored samples to each of said plurality of multiplexors, wherein each of said plurality of multiplexors selects a corresponding 1/Nth portion of said stored samples such that none of the selected 1/Nth portion contains bits representing multiple data values.

11. The GNSS receiver of claim 1, wherein said input signal is received according to one of Galileo, GPS and WAAS standards.

12. A Global Navigation Satellite System (GNSS) receiver comprising:

an analog to digital converter (ADC) that samples an input signal comprising GNSS signals to generate a set of samples;

a buffer that stores the set of samples and that provides some of the set of samples as window samples;

a plurality of multiplexors, each to receive all samples stored in the buffer, that and selectively forwards only a corresponding one of the sets of samples to each of a plurality of correlators as a corresponding one of window samples, the plurality of correlators generating a correlation result indicating similarity between a local signal and the set of samples; and a processor that controls at least one of a frequency of a local carrier signal and a phase of a local code search for code phase and Doppler frequency on the GNSS signals according to the correlation result.

13. The GNSS receiver of claim 12, wherein each of the plurality of correlators is designed to perform a plurality of searches for Doppler frequency on the set of samples, and wherein each of the plurality of multiplexors is designed such that the window samples does not contain different bits representing different data values while performing said plurality of searches for Doppler frequency.

14. A Global Navigation Satellite System (GNSS) receiver comprising:

an analog to digital converter (ADC) that samples an input signal comprising GNSS signals to generate a set of samples;

a buffer that stores the set of samples and that provides some of the set of samples as window samples;

a plurality of multiplexors, each to receive all samples stored in the buffer, that and selectively forwards only a corresponding one of the sets of samples to each of a plurality of correlators as a corresponding one of window samples, the plurality of correlators generating a correlation result indicating similarity between a local signal and the set of samples, wherein a corresponding one of the plurality of multiplexors selects a corresponding set of samples to be forwarded to the corresponding correlate, in response to a plurality of select signals asserted for a duration, wherein each of the plurality of select signals is asserted such that the window samples does not contain different bits representing multiple data values for plurality of Doppler frequency searches; and a processor that controls at least one of a frequency of a local carrier signal and a phase of a local code search for code phase and Doppler frequency on the GNSS signals according to the correlation result.

15. A method for operating a Global Navigation Satellite System (GNSS) receiver, the method comprising:

sampling an input signal comprising a plurality of GNSS signals to generate a set of samples;

storing the set of samples and selectively forwarding only a corresponding one of the sets of samples to each of a plurality of correlators as corresponding window samples;

generating a correlation result indicating a similarity between a local signal and the set of samples; and controlling at least one of a frequency of a local carrier signal and a phase of a local code search for code phase and Doppler frequency on the GNSS signals according to the correlation result, wherein the local code search is performed using the same local code without rotation in each of said correlators while performing a search for code phase and Doppler frequency.

16. A method for operating a Global Navigation Satellite System (GNSS) receiver, the method comprising:

sampling an input signal comprising a plurality of GNSS signals to generate a set of samples;

storing the set of samples and selectively forwarding only a corresponding one of the sets of samples to each of a plurality of correlators as corresponding window samples;

generating a correlation result indicating a similarity between a local signal and the set of samples; and controlling at least one of a frequency of a local carrier signal and a phase of a local code search for code phase and Doppler frequency on the GNSS signals according to the correlation result, wherein selectively forwarding comprises forwarding using a plurality of multiplexers wherein each of the multiplexors is designed such that the window samples do not contain different bits representing different data values while performing the search for Doppler frequency, the plurality of multiplexers being activated in response to a plurality of select signals.

17. The method of claim 16, wherein each of said plurality of select signals is asserted such that window samples does not contain different bits representing multiple data values for plurality of Doppler frequency searches.

18. The GNSS receiver of claim 8, wherein the plurality of multiplexers each receive two code period worth samples from the buffer and selectively forward samples worth one code period duration to the correlate only as one of the plurality of window samples.

19. The GNSS receiver of claim 10, wherein the memory block stores samples corresponding to more than two times the window samples of said input signal.

20. The GNSS receiver of claim 10, wherein the buffer provides ⅔ stored samples to each of the plurality of multiplexors.

21. The GNSS receiver of claim 20, wherein each of the plurality of multiplexors selects a corresponding ⅓ portion of the stored samples.

* * * * *